United States Patent
Faryar et al.

(10) Patent No.: US 6,289,052 B1
(45) Date of Patent: Sep. 11, 2001

(54) METHODS AND APPARATUS FOR MOTION ESTIMATION USING CAUSAL TEMPLATES

(75) Inventors: Alireza Farid Faryar, Fair Haven; Moushumi Sen, West End; Kyeong Ho Yang, Freehold, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/326,873

(22) Filed: Jun. 7, 1999

(51) Int. Cl.$^7$ ..................................................... H04N 7/12
(52) U.S. Cl. ...................................... 375/240.16; 348/699
(58) Field of Search ....................... 375/240.16, 240.17; 348/699, 700, 416.1; 382/236, 243; 386/111; 358/430

(56) References Cited

U.S. PATENT DOCUMENTS

| | | | |
|---|---|---|---|
| 5,619,268 | * 4/1997 | Kobayashi et al. | 348/416 |
| 5,734,737 | * 3/1998 | Chang et al. | 382/107 |
| 5,748,761 | * 5/1998 | Chang et al. | 382/107 |
| 5,818,535 | * 10/1998 | Asnis et al. | 348/416 |
| 6,154,578 | * 11/2000 | Park et al. | 382/293 |

OTHER PUBLICATIONS

Tsukamoto et al., "Pose estimation of human face using synthesized model images", ICIP, vol. 3, pp. 93–97, Nov. 1994.*

Evans, A.N., "Full field motion estimation for large non rigid bodies using correlation/relaxation labelling", Sixth Intern. Conf. on Image Proc. and Its Appl., vol. 2, pp. 473–477, Jul. 1997.*

J.R. Jain et al., "Displacement Measurement and Its Application in Interframe Image Coding," IEEE Transactions on Communications, vol. COM–29, No. 12, pp. 1799–1808, Dec. 1981.

R. Srinivasan et al., "Predictive Coding Based on Efficient Motion Estimation," IEEE Transactions on Communications, vol. COM–33, No. 8, pp. 888–896, Aug. 1985.

N.D. Memon et al., "Lossless Compression of Video Sequences," IEEE Transactions on Communications, vol. 44, No. 10, pp. 1340–1345, Oct. 1996.

* cited by examiner

Primary Examiner—Vu Le
(74) Attorney, Agent, or Firm—Ryan, Mason & Lewis, LLP

(57) ABSTRACT

A method of generating a motion vector associated with a current block of a current frame of a video sequence includes searching at least a section of a reference frame to identify previously reconstructed samples from the reference frame that best estimate motion associated with previously reconstructed samples from the current frame associated with the current block. The previously reconstructed samples may form sets of samples. Such sets may be in the form of respective templates. The method then includes computing a motion vector identifying the location of the set of previously reconstructed samples from the reference frame that best estimates the set of previously reconstructed samples from the current frame associated with the current block. It is to be appreciated such a motion estimation technique is performed in both a video encoder and video decoder so that motion vector data does not need to be transmitted from the encoder to the decoder.

25 Claims, 6 Drawing Sheets

METHODS AND APPARATUS FOR MOTION ESTIMATION USING CAUSAL TEMPLATES

The U.S. Government has a paid-up license in this invention and the right in limited circumstances to require the patent owner to license others on reasonable terms as provided for by the terms of NIST cooperative agreement no. 70NANB7H3051 (proposal no. 97-04-0020) entitled: "Enabling Technology for a Digital Video Optical Tape Recorder of High Definition Motion Imagery."

CROSS REFERENCE TO RELATED APPLICATIONS

The present application is related to U.S. patent applications respectively identified as Ser. No. 09/326,874 and entitled: "Methods and Apparatus for Context-Based Perceptual Quantization," and as Ser. No. 09/326,872 and entitled "Methods And Apparatus For Context-based Inter/Intra Mode Selection," both filed concurrently with the present application on Jun. 7, 1999.

FIELD OF THE INVENTION

The invention relates to video compression and, more particularly, to motion estimation methods and apparatus in a video compression system.

BACKGROUND OF THE INVENTION

Hybrid coding methods are widely used to efficiently represent video sequences, where temporal prediction is first performed to reduce temporal redundancy in a video sequence and the resultant prediction errors are then encoded. Such coding approaches have been described in technical literature such as, for example, in: *Draft of MPEG-2: Test Model 5*, ISO/IEC JTC1/SC29/WG11, April 1993; *Draft of ITU-T Recommendation H.263*, ITU-T SG XV, December 1995; A. N. Netravali and B. G. Haskell, *Digital Pictures: Representation, Compression, and Standards*, $2^{nd}$ Ed., Plenum Press, 1995; and B. Haskell, A. Puri, and A. N. Netravali, *Digital Video: An Introduction to MPEG-2*, Chapman and Hall, 1997, the disclosures of which are incorporated herein by reference. It is well known that motion compensated prediction following motion estimation removes temporal redundancy very effectively. There have been many proposed motion estimation algorithms, most of which are based on block matching. Such motion estimation approaches have been described in technical literature such as, for example, in: J. R. Jain and A. K. Jain, "Displacement Measurement And Its Application In Interframe Image Coding," *IEEE Trans. Communications*, vol. COM-29, pp.1799–1808, December 1981; H. G. Musmann, P. Pirsch, and H. J. Gralleer, "Advances In Picture Coding," *Proc. IEEE*, vol. 73, no. 4, pp.523–548, Aprail 1985; R. Srinivassan and K. R. Rao, "Predictive Coding Based On Efficient Motion Estimation," *IEEE Trans. Communications*, vol. COM-33, no.8, pp.888–896, August 1985; and N. D. Memon and K. Sayood, "Lossless Compression Of Video Sequences," *IEEE Trans. Communications*, vol. 44, no. 10, pp.1340–1345, October 1996, the disclosures of which are incorporated herein by reference. The block matching algorithm attempts to find a block in the reference frame which best matches the current block in terms of mean squared difference or mean absolute difference. The block matching approach has been adopted in many video compression standards since it is easy to implement and provides good estimation performance.

A decoder requires motion vector information for the current block or knowledge of all the data used in the motion estimation performed at the encoder to decode the block properly. However, samples used by these motion estimation algorithms are not available at the decoder. Therefore, these prior art motion estimation algorithms require sending overhead bits pertaining to motion vector information for the current block to a corresponding decoder. The burden of sending overhead bits pertaining to motion vector information to the decoder can be extremely heavy, particularly when block matching is performed on a small block or on a pixel basis. Thus, it would be highly advantageous to have a motion estimation process that does not require motion vector information to be transmitted to a decoder.

SUMMARY OF THE INVENTION

The present invention provides for motion estimation wherein a motion vector is generated for a current block of a current frame of a video sequence based only on previously reconstructed samples. Particularly, rather than using the current block as the basis for locating a block in a reference frame that best estimates the current block, as is done during conventional motion estimation, the present invention uses only previously reconstructed representations of samples adjacent to the current block, i.e., neighboring samples, as the basis for locating previously reconstructed samples in the reference frame that best estimate the previously reconstructed samples associated with the current block. A motion vector is then generated from the previously reconstructed samples identified in the reference frame. The motion vector may be used to retrieve a motion compensated block in the reference frame from which a predictor signal may then be generated.

Advantageously, by performing motion estimation in this inventive manner, motion vector information does not need to be transmitted by an encoder to a decoder for the current block. That is, since all previously reconstructed samples are available at the decoder at the time a bit stream representing the encoded current block is received at the decoder, the decoder does not require motion vector information pertaining to the current block. The decoder thus performs motion estimation in a similar manner as is done at the encoder, that is, using previously reconstructed samples already available. As a result, transmission bandwidth and/or storage capacity is saved.

In one aspect of the invention, a method of generating a motion vector associated with a current block of a current frame of a video sequence includes searching at least a section of a reference frame to identify previously reconstructed samples from the reference frame that best estimate motion associated with previously reconstructed samples from the current frame associated with the current block. The previously reconstructed samples may form sets of samples. Such sets may be in the form of respective templates. A template having only previously reconstructed samples is referred to as a causal template. The method then includes computing a motion vector identifying the location of the previously reconstructed samples from the reference frame that best estimate the previously reconstructed samples from the current frame associated with the current block. It is to be appreciated such a motion estimation technique is performed in both a video encoder and video decoder so that motion vector data does not need to be transmitted from the encoder to the decoder.

DETAILED DESCRIPTION OF PREFERRED EMBODIMENTS

As used herein, the term "video" or "video sequence" should be understood to include any frame or field sequence which is in a form suitable for encoding in accordance with standards such as, for example, H.261, H.263, Motion-JPEG, MPEG-1 and MPEG-2. The term "block" as used in accordance with the invention is intended to include not only macroblocks as defined in the above-noted compression standards, but more generally, any grouping of pixel elements in a video frame or field. It is to be appreciated that such a grouping may include a set of pixels or a single pixel. Further, the meaning of the term "sample" as used in accordance with the invention refers to a pixel or some subset of information, e.g., component, associated with a pixel.

Figure 1:
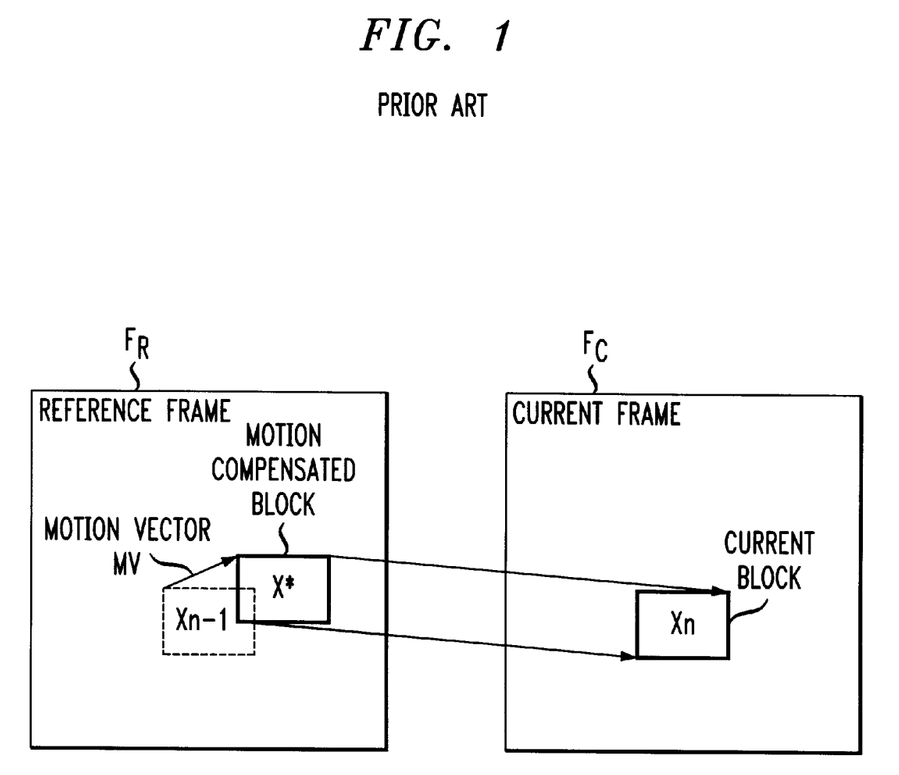
FIG. 1 is a diagram of conventional templates used for motion estimation in a conventional manner.

It is known that in prior art encoders that employ motion estimation based on block matching, the current block in a current frame is used as the block to be matched to a corresponding block in a reference frame. Conventional motion estimation using block matching is illustrated in FIG. 1. $X_n$ represents the current block in a current frame $F_c$ to be encoded by the encoder. In order to estimate the motion associated with this current block of pixel elements, the conventional block matching algorithm performs a search to find a corresponding block in the reference frame that best matches the current block. The best match is found based on some specified criteria such as the minimum mean absolute error, MAE, or minimum mean square error, MSE, as are well known in the art. In FIG. 1, $X_{n-1}$, represents the block in a reference flame $F_r$ at the same spatial location as $X_n$. As is known in the art, a search is performed over a predetermined search area of the reference frame, which includes $X_{n-1}$, for a block that best estimates the current block. Typically, all the blocks in the search area are considered. The best matching block is the block in the reference frame that yields a minimum MAE or a minimum MSE, depending on the search criteria employed. Thus, as illustrated in FIG. 1, $X^*$ represents the corresponding block in the reference frame identified by the best match search criteria. A motion vector MV is then computed which represents the two dimensional coordinate position difference between $X_{n-1}$ and $X^*$. As is evident, in order to generate motion vectors, the conventional motion estimation process requires input from the original video source for the current block, i.e., prior to the block being encoded, and from a reference frame memory for the reference frame.

Then, as is known in the art, motion compensation involves actually retrieving the identified best block using the motion vector computed in the motion estimation process. A predictor signal is then generated, using the motion compensated estimate, i.e., best block, which is subtracted from the original video signal representing the current block to form a prediction error. The prediction error signal is thus the difference between the actual value of a block and its predictor. The prediction error is then itself encoded and transmitted to the decoder along with the corresponding motion vector data generated in the motion estimation process.

Now, turning to a corresponding conventional decoder, since such decoder needs data associated with the motion estimation process performed at the encoder, i.e., motion vectors, to decode the received bit stream, such data must be provided in the transmission. As mentioned, this may yield unacceptable overhead in an attached transmission or storage medium having a limited bandwidth or capacity.

In a significant departure from such prior art encoding approaches, an encoder of the present invention provides motion estimation of a current block without input from the original video source. Rather, the motion estimation process of the invention is accomplished via input signals from a current frame memory and a reference frame memory. As will be seen, the current frame memory contains only previously reconstructed samples from the current frame being encoded, while the reference frame memory contains previously reconstructed samples from a reference frame. Motion estimation is accomplished according to the invention using templates, i.e., sets of samples, consisting only of previously reconstructed representations of samples, rather than the current block itself. Thus, it is to be appreciated that all the samples used to perform motion estimation according to the invention are available at the decoder, since they have, themselves, already been reconstructed and stored in memory. As a result, an encoder of the invention performs motion estimation without the need to provide motion vector information to the corresponding decoder. A corresponding decoder does not need such data since, as will be seen, it performs motion estimation independently using the same causal templates as those used at the encoder. Advantageously, transmission bandwidth and/or storage capacity is saved.

Figure 2:
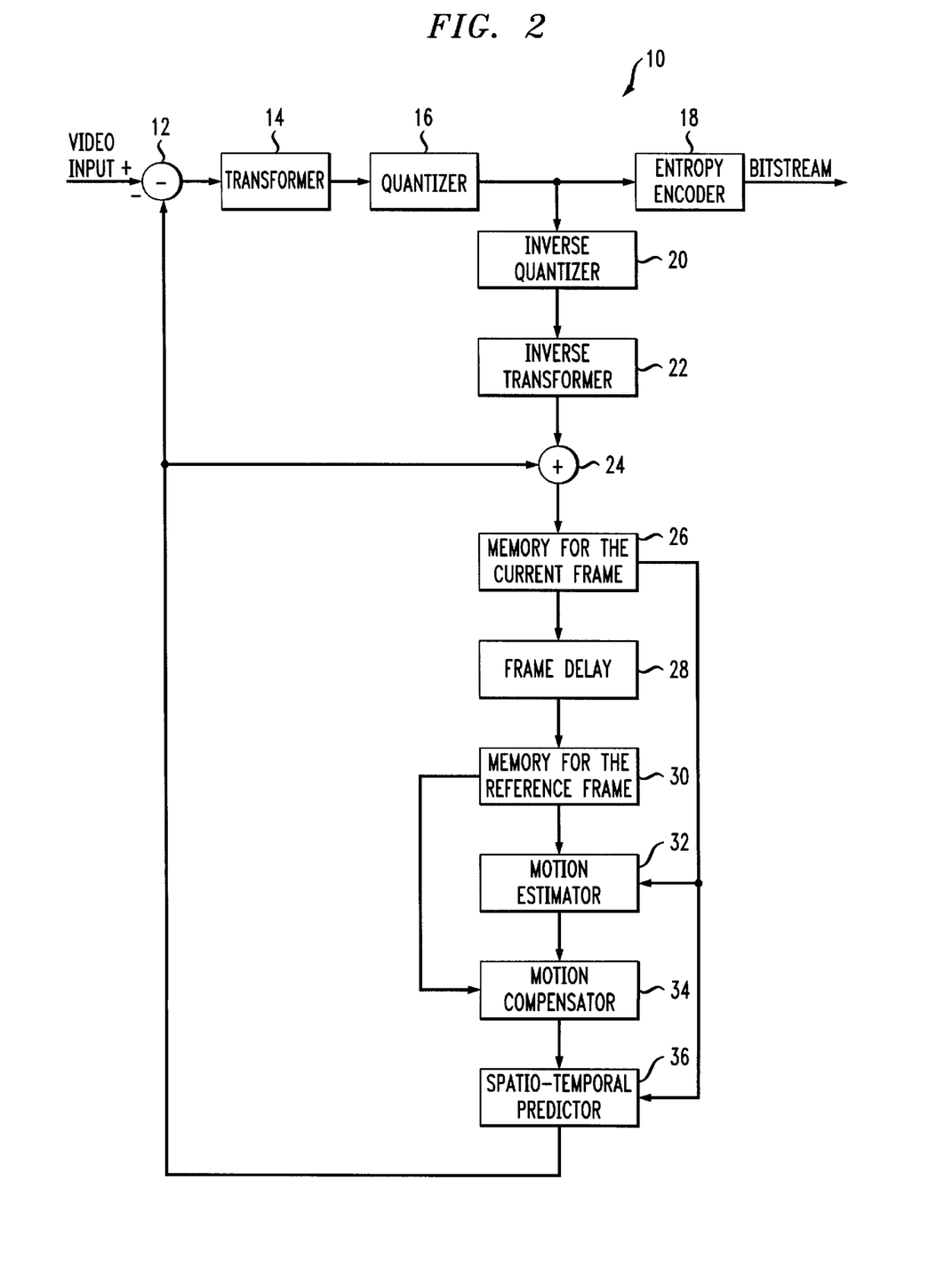
FIG. 2 is a block diagram of a video encoder according to an exemplary embodiment of the present invention.

FIG. 2 depicts a block diagram of a video encoder implementing motion estimation using causal templates according to an exemplary embodiment of the invention. The encoder 10 includes a signal subtractor 12 having a first input terminal coupled to the input terminal of the encoder 10. The encoder 10 also includes a transformer 14 having an input terminal coupled to an output terminal of the signal subtractor 12. The encoder 10 also includes a quantizer 16 having an input terminal coupled to an output terminal of the transformer 14, and an entropy encoder 18 having an input terminal coupled to an output terminal of the quantizer 16. The entropy encoder 18 has its output terminal coupled to the output terminal of the encoder 10. The encoder 10 also includes an inverse quantizer 20 having an input terminal coupled to the output terminal of the quantizer 16. The encoder 10 also includes an inverse transformer 22 having an input terminal coupled to an output terminal of the inverse quantizer 20, and a signal adder 24 having a first input terminal coupled to an output terminal of the inverse transformer 22. Further, the encoder includes a current frame memory 26 having an input terminal coupled to an output terminal of the signal adder 24 and a reference frame memory 30 having an input terminal coupled to an output terminal of the current frame memory 26. It is to be appreciated that a fame delay block 28 is shown interposed between the current frame memory 26 and the reference frame memory 30. It should be understood that this block merely indicates that there is a one frame period delay between samples in the current frame memory and samples in the reference frame memory. Still further, the encoder 10 includes a motion estimator 32 with input terminals coupled to output terminals of the current frame memory 26 and the reference frame memory 30. The encoder 10 also includes a motion compensator 34 having a first input terminal coupled to an output terminal of the motion estimator 32 and a second input terminal coupled to the output terminal of the reference frame memory 30. Lastly, the encoder 10 includes a spatio-temporal predictor 36 having a first input terminal coupled to an output terminal of the motion compensator 34 and the output terminal of the current frame memory 26. The spatio-temporal predictor 36 also has an output terminal coupled to a second input terminal of the signal subtractor 12 and a second input terminal of the signal adder 24.

Figure 3:
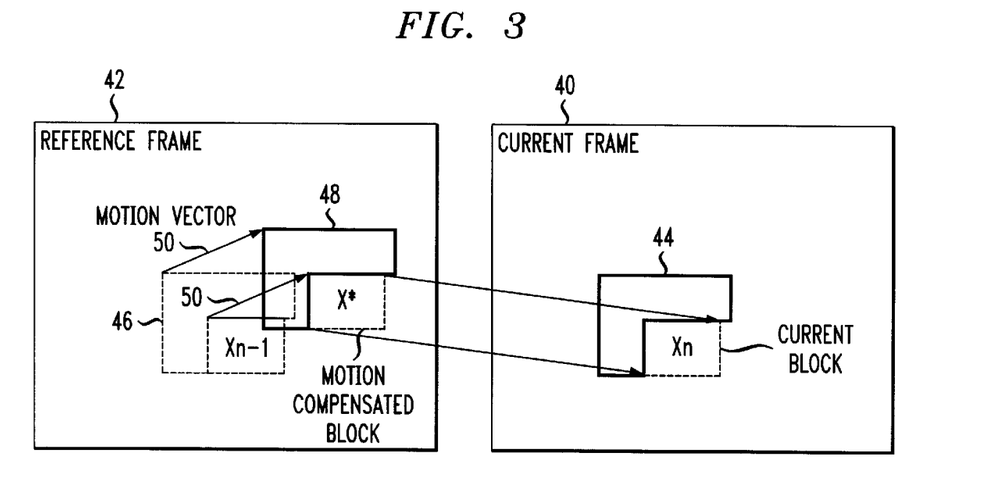
FIG. 3 is a diagram of causal templates for a reference frame and a current frame used for motion estimation according to the present invention.

Given the above interconnectivity of components in the exemplary encoder 10, a description of a corresponding encoding operation will now follow. It is to be appreciated that the encoder 10 may be employed to encode a video sequence on a block by block basis. A block may be a pixel, a set of pixels or some other portion of a frame. Nonetheless, as will be explained in detail, the present invention employs causal templates to perform motion estimation which include previously reconstructed samples, i.e., pixel or some subset of information associated therewith, from a current frame and a reference frame. The concept is generally illustrated, by way of example, in FIG. 3. FIG. 3 shows causal templates, used to perform motion estimation, formed from a current frame 40 and a reference frame 42. $X_{n-1}$ refers to the current block, in this case, a set of pixels, to be encoded in the current frame 40 and $X_{n-1}$ refers to the spatially corresponding block in the reference frame 42. As shown, a causal template 44 is formed from samples in the current frame 40. Notice that the template 44 does not include the current block $X_n$. It is assumed that samples of the current frame are processed, e.g., encoded and reconstructed, from the upper left hand corner of the frame to the lower right hand corner of the frame. Thus, template 44 only includes samples from the current frame which have already been encoded and reconstructed.

In contrast to conventional block matching motion estimation techniques, motion estimation according to the invention is not concerned with searching for the block that best matches the current block, but rather is concerned with searching for a corresponding template in the reference frame that best matches the causal template formed by previously reconstructed samples adjacent to or neighboring the current block. Thus, a search area is identified which includes $X_{n-1}$ and its associated template 46. Then, a motion estimator of the invention searches all the possible templates in the search area to identify the template that best estimates motion associated with template 44. In FIG. 3, the best matching template is found to be template 48. Then, a motion vector 50 is computed which represents the two dimensional coordinate position difference between template 46 and template 48. Given the best matching template 48, the block to be used for motion compensation purposes is consequently identified. In this example, such block is identified as X*. It is to be appreciated that the motion vector computed as the coordinate position difference between templates 46 and 48 is the same value as the coordinate position difference between $X_{n-1}$ and X* since, as seen in FIG. 3, they have the same magnitude and direction associated therewith.

Then, the motion vector 50 is used by the motion compensator to retrieve the block associated with the best matching template 48, which in this case is X*. At this point, motion compensation may be performed in a manner similar to conventional motion compensation techniques. That is, the motion compensated prediction is used to form a predictor, which is then subtracted from the original block to form a prediction error. However, it is to be appreciated that since computation of motion vectors according to the invention is based only on previously reconstructed samples, e.g., causal templates, the motion vectors do not need to be transmitted to the decoder. Instead, the decoder as will be explained in the context of FIG. 6 obtains the motion vectors by performing motion estimation using the same templates as those used at the encoder.

Referring back to FIG. 2, an overall encoding procedure will now be explained. First, the encoder 10 receives an input signal. The input signal may be a video sequence consisting of many frames. A prediction error signal is generated by the signal subtractor 12 as a result of subtracting a predictor signal from the input signal. In the prior art, as explained above, a predictor signal is generated using motion estimation and compensation that relies upon input of the current block itself and a reference frame. However, motion estimation and compensation in an encoder of the invention is performed using only previously reconstructed samples and thus does not require input of the current block. The reconstructed samples employed are selected from samples in blocks that preceded the current block in the encoding process, that is, neighboring samples that have already been encoded and reconstructed.

An explanation of the formation of the predictor signal for the current block requires returning to the encoding iteration of the previous block in the current frame. In that encoding iteration, a prediction error associated with the previous block is transformed, e.g., employing discrete cosine transforms, by transformer 14, quantized by quantizer 16 and sent to the entropy encoder 18 for entropy encoding and eventual output. However, after quantization, the prediction error is also provided to the inverse quantizer 20 where the effects of the quantization process are reversed, as is known in the art. Next, the output of the inverse quantizer is inverse transformed by inverse transformer 22, as is also known in the art. Then, since predictive encoding is implemented, the predictor signal for that block is added back to the prediction error in signal adder 24 such that a reconstructed representation of that block is generated. The reconstructed block is stored in the current frame memory 26. It is to be understood that each previously reconstructed block from the current frame preceding this block is also stored in the current frame memory. After an entire current frame is reconstructed, i.e., when the last block in a current frame is reconstructed, the reconstructed frame is transferred to the reference frame memory 30. As a result, when the first block of the next frame is processed, a reference frame delayed by one frame period exists in the reference frame memory. Since no reference frame exists for the first frame processed, motion estimation is typically not performed on the first frame.

In any case, assuming a reference frame is available in the reference frame memory 30 and that a certain preferred amount of preceding blocks of the current frame were reconstructed and stored in the current frame memory in the manner explained above, the motion estimator 32 forms causal templates, for example as shown in FIG. 3 and, as will be explained, FIG. 4, from these previously reconstructed samples in order to generate a motion vector and eventually a predictor signal for the current block.

Figure 4:
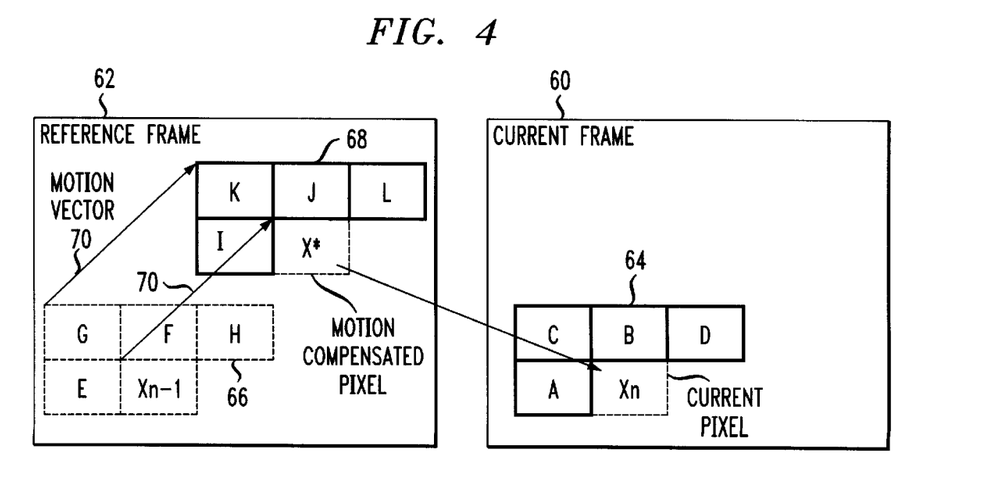
FIG. 4 is a diagram of causal templates for a reference frame and a current frame used for motion estimation in a pixel-based predictive coding in the spatial domain according to the present invention.

Referring to FIG. 4, an example is given to illustrate motion estimation according to the invention assuming that encoder 10 performs pixel-based predictive coding of a video sequence. In this example, $X_n$ represents the current pixel that is being encoded in the current frame 60. Motion estimator 32 forms template 64 from previously reconstructed pixels A, B, C and D taken from the current frame memory 26. Then, the motion estimator determines which pixel in a reference frame 62 is the pixel that spatially corresponds to the current pixel. In FIG. 4, $X_{n-1}$ represents the spatially corresponding pixel. A template 66 which spatially corresponds to template 64 is then identified. As seen, template 66 includes pixels E, F, G and H, which respectively spatially correspond to pixels A, B, C and D in template 64. A search area is then identified which includes template 66. Next, the motion estimator performs a search for the template in the search area that best estimates motion in the template 64. In FIG. 4, the best matching template is identified as template 68. Template 68 includes pixels I, J, K and L. Given the known amount of pixels in the templates employed, the pixel that is to be used for motion compensation and generation of the predictor signal can be identified, e.g., $X^*$. Motion estimator 32 then computes a motion vector 70 representing the coordinate position difference between template 66 and template 68 which, by virtue of the fact that template 66 spatially corresponds to template 64, also represents the coordinate position difference between template 64 and template 68.

An example of a search method that may be employed by the invention to find the best matching template in the reference frame will now be explained using the four pixel templates illustrated in FIG. 4. It should be understood that while the templates in FIG. 4 employ the four previously reconstructed pixels adjacent to a particular pixel, templates formed in accordance with the invention are not so limited. That is, they may include a greater or lesser number of samples. Also, the samples do not necessarily have to be contiguous with respect to the current pixel to be encoded. But it is preferred to use samples (or blocks) which are contiguous to the current block since they have a higher correlation with the current sample than those that are not contiguous. Nonetheless, template 64 includes the four previously reconstructed pixels with respect to $X_n$ such that pixel A may be represented as $X_n(i, j-1)$, pixel B may be represented as $X_n(i-1, j)$, pixel C may be represented as $X_n(i-1, j-1)$ and pixel D may be represented as $X_n(i-1, j-1)$, where i and j represent the two dimensional coordinates associated with each pixel in the frame, and where i=1, 2, 3, . . . M and j=1, 2, 3 . . . N. In that case, template 66 includes the four previously reconstructed pixels with respect to $X_{n-1}$ such that pixel E may be represented as $X_{n-1}(i, j-1)$, pixel F may be represented as $X_{n-1}(i-1, j)$, pixel G may be represented as $X_{n-1}(i-1, j-1)$ and pixel H may be represented as $X_{n-1}(i-1, j+1)$. The search criterion used for performing motion estimation in this example is the sum of the absolute differences (SAD). In this manner, the spatially corresponding reference frame template 66 is displaced by a vector (v, h), which represents the search location within the search area. The SAD between the current template 64 and each template in the reference frame under consideration is then computed. The template under consideration may be represented as $\{X_{n-1}(i-v,j-1-h), X_{n-1}(i-1-v,j-h), X_{n-1}(i-1-v,j-1-h), X_{n-1}(i-1-v,j+1-h)\}$. Thus, the SAD for each location in the search area may be represented as:

$$SAD(v,h)=|X_n(i,j-1)-X_{n-1}(i-v,j-1-h)|+|X_{n-1}(i-1,j)-X_{n-1}(i-1-v,j-h)|$$
$$+|X_n(i-1,j-1)-X_{n-1}(i-1-v,j-1-h)|+|X_{n-1}(i-1,j+1)-X_{n-1}(i-1-v,j+1-h)|. \quad (1)$$

The template in the reference frame under consideration at search location (v, h) that yields the minimum SAD is thus identified as the best matching template.

As mentioned, once the best matching template is found, a motion vector is computed representing the difference between the spatially corresponding template, e.g., template 66, and the best matching template, e.g., template 68. Since the value of the motion vector is the same for the difference between pixel $X_{n-1}$ and $X^*$, this motion vector data is provided to the motion compensator 34 which uses the data to retrieve the pixel $X^*$ as the motion compensated pixel. Then, the predictor 36 generates the predictor signal in response to the motion compensated pixel, as is known in the art. The predictor signal is then subtracted from the current pixel yielding the prediction error for the current pixel. The prediction error associated with the current pixel sample is quantized by quantizer 16, entropy encoded by entropy encoder 18 and then transmitted and/or stored. In addition, as explained above, after quantization, the current pixel is reconstructed and stored in the current frame memory for use in a template during motion estimation of the next pixel in the frame. It should be understood that the transformer 14 and the inverse transformer 22 are not needed in this example of pixel-based predictive coding in the spatial domain.

Advantageously, only the prediction error signal associated with the current pixel is transmitted and/or stored. Motion vector data associated with the current pixel is not transmitted and/or stored because the corresponding decoder is able to independently generate the motion vector data itself in order to perform motion compensation associated with the current pixel.

Figure 5A:
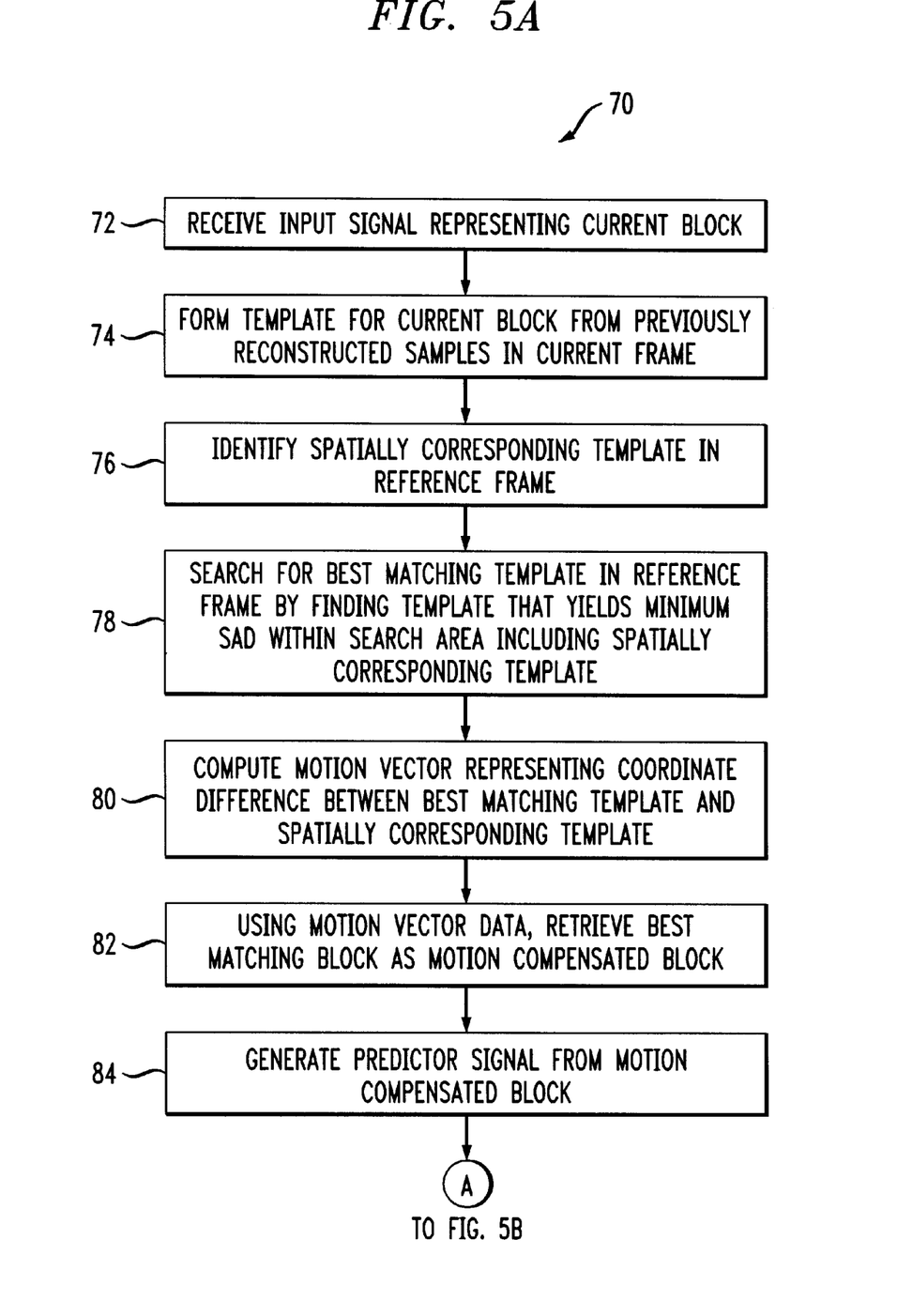
FIGS. 5A and 5B are a flow diagram illustrating an encoding process employing motion estimation according to an exemplary embodiment of the present invention.
Figure 5B:
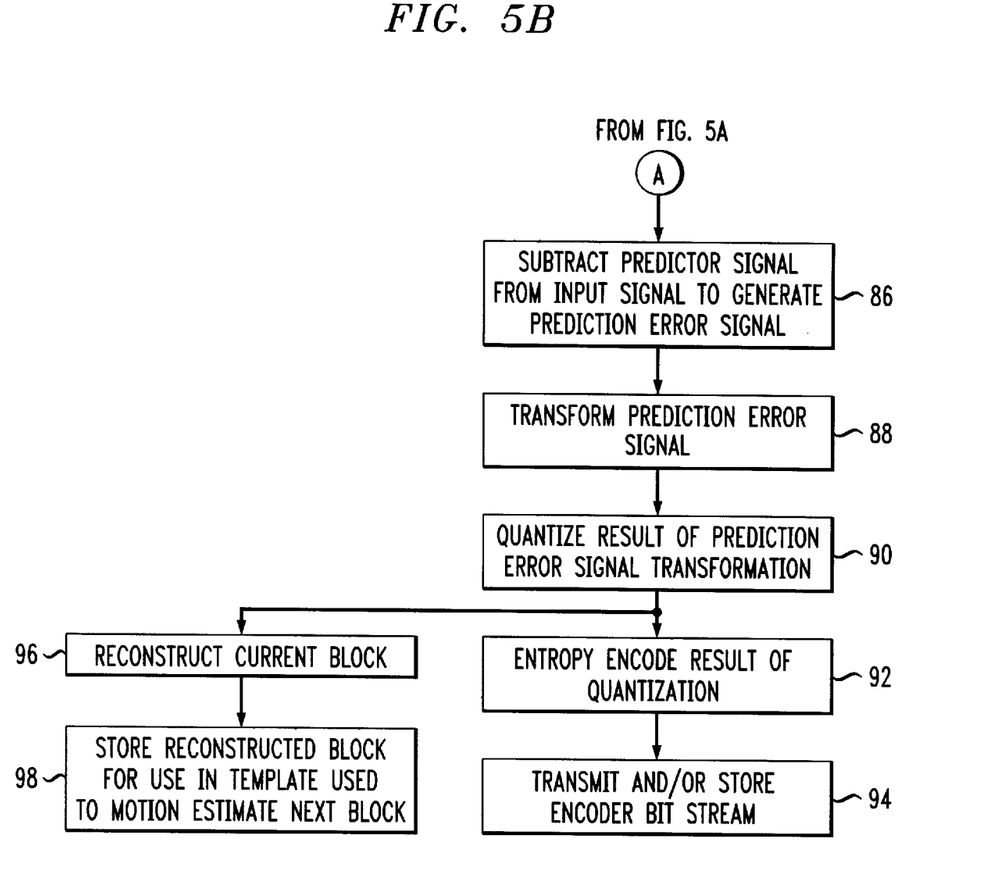

Referring now to FIGS. 5A and 5B, a flow chart of an exemplary encoding method 70 according to the invention is shown. It is assumed that predictive encoding is implemented and the overall encoding process has already progressed such that a reference frame is available and a preferred amount of previously reconstructed samples are also available. In step 72, a video input signal representing the current block is received. A template is formed for the current block from previously reconstructed samples in the current frame, in step 74. Next, in step 76, the spatially corresponding template is identified in the reference frame. In step 78, a search is performed to locate the best matching template in the reference frame. In this exemplary embodiment, this includes finding the template that yields the minimum sum of absolute differences, SAD, within a search area that includes the template spatially corresponding to the template in the current frame.

In step 80, a motion vector is computed representing the coordinate position difference between the best matching template and the spatially corresponding template and thus the template in the current frame. Using the computed motion vector data, in step 82, the best matching block is retrieved as the motion compensated block. In step 84, a predictor signal is generated from the motion compensated block. Next, in step 86, the predictor signal is subtracted from the input signal thus generating a prediction error signal associated with the current block. The prediction error signal for the current block is transformed, in step 88, and the results of the transformation are quantized, in step 90. Then, in step 92, the result of the quantization process for the current block is entropy encoded. In step 94, the encoded bit stream is transmitted and/or stored.

In addition, the quantization results are reconstructed in step 96. That is, the prediction error for the current block is inverse quantized, inverse transformed and then the predictor signal is added back to the prediction error to generate a reconstructed representation of the current block. The reconstructed current block is then stored, in step 98, such that samples therefrom may be used in the template employed to motion estimate the next block of the current frame. Advantageously, in this manner, only the encoded bit stream representing the prediction error associated with the current block is transmitted/stored. That is, no motion vector data is transmitted/stored since it is not needed at the decoder, as will be seen with respect to FIG. 6.

Figure 6:
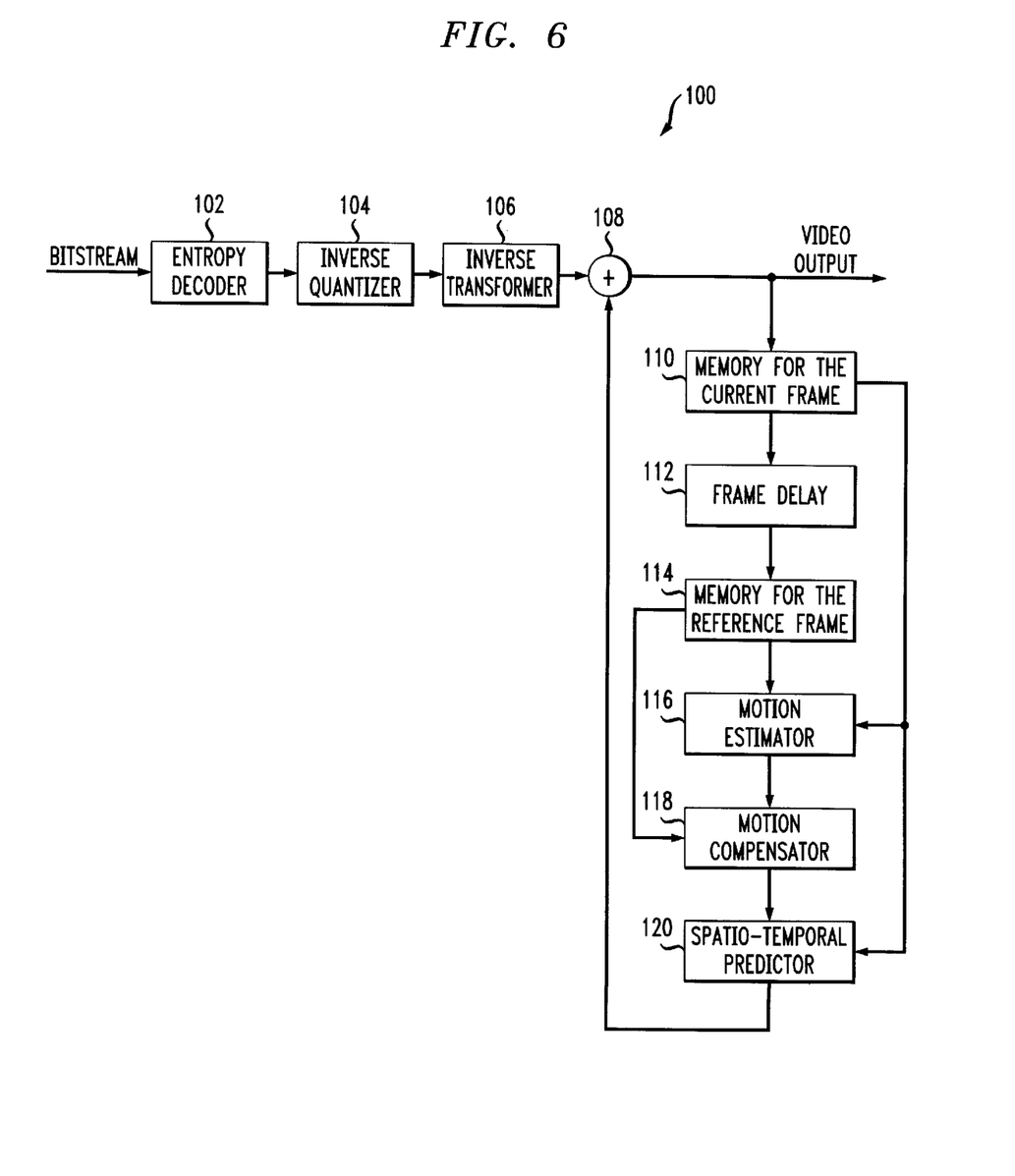
FIG. 6 is a block diagram of a video decoder according to an exemplary embodiment of the present invention.

Referring now to FIG. 6, a block diagram of a video decoder implementing motion estimation using causal templates according to an exemplary embodiment of the invention is depicted. The decoder includes elements similar to those employed and described in conjunction with the encoder 10. The decoder 100 includes an entropy decoder 102, an inverse quantizer 104 coupled to the entropy decoder, and an inverse transformer 106 coupled to the inverse quantizer. The decoder 100 also includes a signal adder 108 coupled to the inverse transformer. A current frame memory 110 is also included in the decoder 100 and is coupled to the signal adder. The decoder 100 also includes a reference frame memory 114 coupled to the current frame memory and separated from the current frame memory by one frame period, i.e., frame delay block 112. Further, the decoder 100 includes a motion estimator 116 coupled to the reference frame memory 114, a motion compensator 118 coupled to the motion estimator, and a spatio-temporal predictor 120 coupled to the motion compensator 118 and the signal adder 108. Each of these elements have similar functions to the functions of the encoder elements with like names described above.

Accordingly, an encoded bit stream representing the encoded prediction error of the current block is received and entropy decoded by the entropy decoder 102. Next, the signal is inverse quantized by inverse quantizer 104 and inverse transformed by inverse transformer 106. Then, the prediction error signal is added with a predictor signal in signal adder 108 to form the reconstructed, i.e., decoded, current block. It is to be appreciated that predictor signal in the decoder 100 is formed in a similar manner to the formation of a predictor signal in the encoder 10, as described above. Particularly, the motion estimator 116 forms a causal template, preferably identical to the template formed by the motion estimator 32 of the encoder, e.g., template 44, template 64, etc., from the previously reconstructed samples stored in the current frame memory 110 and reference frame memory 114. This template is used to perform motion estimation in the same way as in the encoder in order to compute a motion vector for retrieving the motion compensated block from the reference frame. Thus, the motion compensator 118 retrieves the motion compensated block and this motion compensated estimate is used by the predictor 120 to generate the predictor signal that is added back to the prediction error of the current block to yield the reconstructed representation of the current block. Also, in the same way that a reconstructed representation of the current block is stored in the current frame memory, the decoded block is stored therein such that samples therefrom may be used in a causal template for motion estimating the next block to be decoded. Advantageously, as is evident from the above example, the decoder does not require motion vector data from the encoder because of the inventive way that blocks are motion estimated, i.e., using only previously reconstructed samples. Therefore, transmission bandwidth and/or storage capacity between an encoder and decoder of the invention is saved.

It should be noted that the elements of the encoder 10 and the decoder 100 may be respectively implemented using a central processing unit, microprocessor, application-specific integrated circuit or other data processing device in a computer, video transmitter, cable system headend, television set-top box or other type of video signal processor. The central processing unit, microprocessor, application-specific integrated circuit or other data processing device may also have memory associated therewith for storing data and results associated with each element's function when necessary. The invention may be utilized in conjunction with numerous types of video processing or transmission systems. Thus, while the invention is illustrated above using an exemplary video encoding system, it should be understood that the invention is not limited to use with any particular type of video signal format, video encoding standard or encoding system configuration. The invention is instead more generally applicable to any video encoding system in which it is desirable to perform motion estimation while not requiring the transmission of motion vector-related overhead information to a corresponding decoder.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of generating a motion vector associated with a current block of a current frame of a video sequence, the method comprising the step of:

searching at least a section of a reference frame to identify previously reconstructed samples from the reference frame that best estimate motion associated with previously reconstructed samples from the current frame associated with the current block whereby a motion vector is computed identifying the location of the previously reconstructed samples from the reference frame that best estimate the previously reconstructed samples from the current frame associated with the current block.

2. The method of claim 1, wherein the previously reconstructed samples form previously reconstructed sample sets.

3. The method of claim 2, wherein the previously reconstructed sets are in the form of respective templates.

4. The method of claim 2, wherein the searching step further includes identifying a set of previously reconstructed samples in the reference frame that spatially corresponds to the set of previously reconstructed samples associated with the current block.

5. The method of claim 4, wherein the searching step further includes identifying a search area in the reference frame which contains the spatially corresponding set of previously reconstructed samples.

6. The method of claim 5, wherein the searching step further includes considering search locations within the search area such that a sum of absolute differences between the set of previously reconstructed samples from the current frame and a set of previously reconstructed samples at each search location is computed.

7. The method of claim 6, wherein the searching step further includes identifying the set of previously reconstructed samples from the reference frame resulting in a minimum sum of absolute differences as the set that best estimates the set from the current frame.

8. The method of claim 7, wherein the searching step further includes generating the motion vector as the coordinate position difference in the reference frame between the spatially corresponding set and the set that best estimates the set from the current frame.

9. The method of claim 1, wherein the motion vector generation is performed in a video encoder.

10. The method of claim 1, wherein the motion vector generation is performed in a video decoder.

11. The method of claim 1, wherein the block is one of a pixel, a set of pixels, and a portion of a frame associated with the video sequence.

12. The method of claim 1, wherein the motion vector is generated for use in retrieving a previously reconstructed block associated with the previously reconstructed best estimate samples from the reference frame as a motion compensated block.

13. A method of encoding a current block of a current frame of a video sequence, the method comprising the steps of:
   generating a prediction error signal corresponding to the current block by motion estimating the current block using previously reconstructed samples from the current frame associated with the current block to identify previously reconstructed best estimate samples from a reference frame whereby a motion vector representing a coordinate position difference between the respective samples in the current frame and the reference frame is calculated; and
   outputting the prediction error without sending the motion vector for decoding by a corresponding decoder.

14. Apparatus for generating a motion vector associated with a current block of a current frame of a video sequence, the apparatus comprising:
   at least one processing device operative to search at least a section of a reference frame to identify previously reconstructed samples from the reference frame that best estimate motion associated with previously reconstructed samples from the current frame associated with the current block whereby a motion vector is computed identifying the location of the previously reconstructed samples from the reference frame that best estimate the previously reconstructed samples from the current frame associated with the current block; and
   memory coupled to the at least one processing device operative to store previously reconstructed samples associated with the current frame and the reference frame.

15. The apparatus of claim 14, wherein the previously reconstructed samples form previously reconstructed sample sets.

16. The apparatus of claim 15, wherein the previously reconstructed sets are in the form of respective templates.

17. The apparatus of claim 15, wherein the processing device is further operative to perform the searching operation by identifying a set of previously reconstructed samples from the reference frame that spatially corresponds to the set of previously reconstructed samples associated with the current block.

18. The apparatus of claim 17, wherein the processing device is further operative to perform the searching operation by identifying a search area in the reference frame which contains the spatially corresponding set of previously reconstructed samples.

19. The apparatus of claim 18, wherein the processing device is further operative to perform the searching operation by considering search locations within the search area such that a sum of absolute differences between the set of previously reconstructed samples from the current frame and a set of previously reconstructed samples at each search location is computed.

20. The apparatus of claim 19, wherein the processing device is further operative to perform the searching operation by identifying the set of previously reconstructed samples from the reference frame resulting in a minimum sum of absolute differences as the set that best estimates the set from the current frame.

21. The apparatus of claim 20, wherein the processing device is further operative to perform the searching operation by generating the motion vector as the coordinate position difference in the reference frame between the spatially corresponding set and the set that best estimates the set from the current frame.

22. The apparatus of claim 14, wherein the motion vector generation is performed in a video encoder.

23. The apparatus of claim 14, wherein the motion vector generation is performed in a video decoder.

24. The apparatus of claim 14, wherein the block is one of a pixel, a set of pixels, and a portion of a frame associated with the video sequence.

25. The apparatus of claim 14, wherein the motion vector is generated for use in retrieving a previously reconstructed block associated with the previously reconstructed best estimate samples from the reference frame as a motion compensated block.

* * * * *